(12) United States Patent
Ichikawa

(10) Patent No.: US 9,186,995 B2
(45) Date of Patent: Nov. 17, 2015

(54) NON-CONTACT POWER RECEIVING APPARATUS AND VEHICLE HAVING THE SAME

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 407 days.

(21) Appl. No.: 13/128,968

(22) PCT Filed: May 14, 2009

(86) PCT No.: PCT/JP2009/058970
§ 371 (c)(1),
(2), (4) Date: May 12, 2011

(87) PCT Pub. No.: WO2010/131346
PCT Pub. Date: Nov. 18, 2010

(65) Prior Publication Data
US 2012/0043172 A1     Feb. 23, 2012

(51) Int. Cl.
*H02J 7/00* (2006.01)
*B60L 5/00* (2006.01)
(Continued)

(52) U.S. Cl.
CPC . *B60L 5/005* (2013.01); *B60L 7/14* (2013.01); *B60L 11/123* (2013.01); *B60L 11/14* (2013.01); *B60L 11/182* (2013.01); *B60L 11/1812* (2013.01); *B60L 11/1816* (2013.01); *B60L 11/1824* (2013.01); *B60L 11/1833* (2013.01); *B60L 11/1835* (2013.01); *H02J 7/025* (2013.01); *B60L 2210/14* (2013.01); *B60L 2210/30* (2013.01); *B60L 2210/40* (2013.01); *B60L 2220/14* (2013.01); *Y02T 10/6217* (2013.01);
(Continued)

(58) Field of Classification Search
USPC .......... 320/108, 109, 115; 307/104, 9.1, 10.1; 180/65.1, 65.21
See application file for complete search history.

(56) References Cited

U.S. PATENT DOCUMENTS 5,341,280 A * 8/1994 Divan et al. ..................... 363/37
6,028,413 A * 2/2000 Brockmann .................. 320/108
(Continued)

FOREIGN PATENT DOCUMENTS

| AU | 2006269374 B2 | 1/2007 |
| AU | 2006269374 C1 | 1/2007 |

(Continued)

OTHER PUBLICATIONS

International Search Report for International Patent Application No. PCT/JP2009/058970, mailed on Aug. 4, 2009.

*Primary Examiner* — Yalkew Fantu
(74) *Attorney, Agent, or Firm* — Oliff PLC

(57) ABSTRACT

A non-contact power receiving apparatus includes a power reception coil receiving, by electromagnetic resonance, the electric power transmitted from a power transmission coil; a rectifier rectifying the electric power received by the power reception coil, a load receiving the electric power rectified by the rectifier; a resistance and a connection switch provided in a pair of power lines for transmitting the electric power from the power reception coil through the rectifier to the load, the resistance and the connection switch being connected in series between the pair of power lines; and a control device. The control device renders the connection switch conductive when determining where the power reception coil is positioned, and renders the connection switch nonconductive when the electric power is transmitted to the load from the power reception coil through the rectifier.

18 Claims, 11 Drawing Sheets

(51) Int. Cl.
  *B60L 11/12* (2006.01)
  *B60L 11/14* (2006.01)
  *B60L 11/18* (2006.01)
  *H02J 7/02* (2006.01)
  *B60L 7/14* (2006.01)

(52) U.S. Cl.
  CPC .......... *Y02T 10/7005* (2013.01); *Y02T 10/7077* (2013.01); *Y02T 10/7225* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | |
|---|---|---|---|
| 6,118,249 A * | 9/2000 | Brockmann et al. | |
| 6,515,878 B1 * | 2/2003 | Meins et al. | 363/37 |
| 7,741,734 B2 | 6/2010 | Joannopoulos et al. | |
| 2007/0222542 A1 | 9/2007 | Joannopoulos et al. | |
| 2008/0278264 A1 | 11/2008 | Karalis et al. | |
| 2009/0039831 A1* | 2/2009 | Ichikawa | 320/118 |
| 2009/0067202 A1* | 3/2009 | Ichikawa et al. | 363/79 |
| 2009/0067207 A1 | 3/2009 | Nishino | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-7-227007 | 8/1995 |
| JP | A-9-182212 | 7/1997 |
| JP | A-2006-345588 | 12/2006 |
| JP | A-2009-501510 | 1/2009 |
| KR | 10-2008-0003310 | 1/2008 |
| KR | 2008-0031398 A | 4/2008 |
| KR | 2010-0015954 A | 2/2010 |
| WO | WO 2007/008646 A1 | 1/2007 |
| WO | WO 2008/118178 A1 | 10/2008 |
| WO | WO 2009/054221 A1 | 4/2009 |

\* cited by examiner

NON-CONTACT POWER RECEIVING APPARATUS AND VEHICLE HAVING THE SAME

TECHNICAL FIELD

The present invention relates to a non-contact power receiving apparatus and a vehicle having the same, and particularly to a non-contact power receiving apparatus having a power reception coil configured to receive the electric power by electromagnetic resonance which is transmitted from a power transmission coil, and a vehicle having the non-contact power receiving apparatus.

BACKGROUND ART

Japanese Patent Laying-Open No. 2006-345588 (Patent Document 1) discloses a non-contact power feeding system using electromagnetic induction which includes positioning means for moving the position of a primary coil so as to maximize the power feeding efficiency obtained by the power feeding efficiency obtaining means.

PRIOR ART DOCUMENTS

Patent Documents

Patent Document 1: Japanese Patent Laying-Open No. 2006-345588
Patent Document 2: Japanese Patent Laying-Open No. 09-182212
Patent Document 3: Pamphlet of International Publication No. 2007/008646

SUMMARY OF THE INVENTION

Problems to be Solved by the Invention

The non-contact power transmission technique for transmitting the electric power in a non-contact manner without using a power supply cord and a power transmission cable includes three known techniques including a power transmission technique performed by using electromagnetic induction, a power transmission technique performed by using a microwave and a power transmission technique performed by the resonance method. Among these techniques, the resonance method is a non-contact, power transmission technique by which a pair of resonators (a pair of self-resonant coils) is resonated in the electromagnetic field (near field) to transmit electric power through the electromagnetic field. This technique also, allows transmission of a large electric power of several kW over a relatively long distance (for example, several meters).

The non-contact power feeding apparatus disclosed in the above-mentioned Japanese Patent Laying-Open No, 2006-345588 requires the positioning means for movably supporting the primary coil to be provided in the power feed facility, which causes an increase in size of the apparatus. In order to expand the use of the apparatus for a generally used vehicle, a more simple system configuration is desirable. Also as to the resonance method, it is required to devise a simplified position detecting method.

An object of the present invention is to provide a non-contact power receiving apparatus having a simplified configuration while ensuring the accuracy of parking of a vehicle in the power feed facility, and a vehicle having the non-contact power receiving apparatus.

Means for Solving the Problems

In summary, the present invention provides a non-contact power receiving apparatus receiving electric power from a power transmission coil for transmitting the electric power received from a power supply. The non-contact power receiving apparatus includes a power reception coil configured to receive, by electromagnetic resonance, the electric power transmitted from the power transmission coil; a rectifier configured to rectify the electric power received by the power reception coil; a load disposed to receive the electric power rectified by the rectifier; a resistance and a connection switch provided in a pair of power lines for transmitting the electric power from the power reception coil through the rectifier to the load, the resistance and the connection switch being connected in series between the pair of power lines; and a control device for controlling the connection switch to determine whether the power reception coil is positioned with respect to the power transmission coil such that the power reception coil can receive the electric power. The control device renders the connection switch conductive when determining where the power reception coil is positioned, and renders the connection switch nonconductive when the electric power is transmitted to the load from the power reception coil through the rectifier.

Preferably, the non-contact power receiving apparatus further includes a motor for driving a vehicle and a power storage device for storing the electric power supplied to the motor. The load includes a charger for charging the power storage device. The resistance and the connection switch are disposed in a portion of the pair of power lines where the rectifier and the power storage device are connected to each other.

Preferably, the non-contact power receiving apparatus further includes a motor for driving a vehicle, a power storage device for storing the electric power supplied to the motor, and a secondary coil capable of receiving the electric power from the power reception coil. The load includes a charger for charging the power storage device. The resistance and the connection switch are disposed in a portion of the pair of power lines where the rectifier and the secondary coil are connected to each other.

Further preferably, the non-contact power receiving apparatus further includes a voltage sensor for alternating-current (AC) peak detection for detecting a voltage arising across the resistance. The control device determines where the power reception coil is positioned based on a detection result of the voltage sensor.

Preferably, the power supply and the power transmission coil are provided in a power feeding apparatus external to a vehicle. When receiving an instruction from a driver of the vehicle to supply the electric power, the control device renders the connection switch conductive to start test transmission of the electric power to the power feeding apparatus, and, based on a magnitude of a voltage arising across the resistance, determines whether the power reception coil is positioned with respect to the power transmission coil such that the power reception coil can receive the electric power.

Further preferably, the control device determines a direction of the vehicle to be moved so as to position the power reception coil with respect to the power transmission coil such that the power reception coil can receive the electric power, while repeatedly determining whether the power reception coil is positioned with respect to the power transmission coil such that the power reception coil can receive the electric power.

Preferably, an impedance of the resistance is matched to the impedance of the power supply.

In another aspect, the present invention provides a vehicle equipped with any non-contact power receiving apparatus described above.

Effects of the Invention

According to the present invention, in the case of using the resonance method, it can be determined in a simple configuration whether or not the vehicle is appropriately positioned.

MODES FOR CARRYING OUT THE INVENTION

Figure 1:
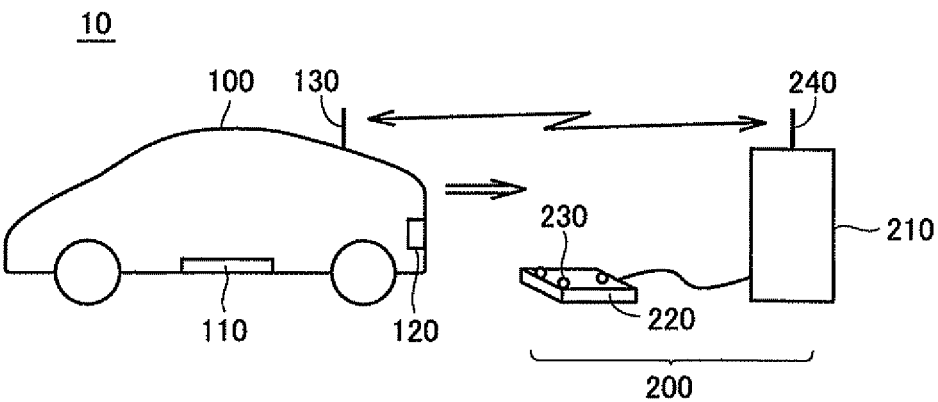
FIG. 1 is an overall configuration diagram of a vehicle power feeding system in accordance with an embodiment of the present invention.

The embodiments of the present invention will be hereinafter described in detail with reference to the accompanying drawings, in which the same or corresponding components are designated by the same reference characters, and description thereof will not be repeated.

First Embodiment

FIG. 1 is an overall configuration diagram of a vehicle power feeding system in accordance with the embodiment of the present invention.

Referring to FIG. 1, a vehicle power feeding system 10 includes a vehicle 100 and a power feeding apparatus 200. Vehicle 100 includes a power reception unit 110, a camera 120 and a communication unit 130.

Power reception unit 110 is installed on the floor of the vehicle body and configured to receive the electric power from a power transmission unit 220 of power feeding apparatus 200 in a non-contact manner. Specifically, power reception unit 110 includes a self-resonant coil described later which resonates with the self-resonant coil provided in power transmission unit 220 through the electromagnetic field for receiving the electric power from power transmission unit 220 in a non-contact manner. Camera 120 is provided for sensing the positional relationship between power reception unit 110 and power transmission unit 220 and attached, for example, to the vehicle body so as to allow camera 120 to capture an image of the scene behind the vehicle. Communication unit 130 serves as a communication interface for establishing communication between vehicle 100 and power feeding apparatus 200.

Power feeding apparatus 200 includes a high-frequency power supply apparatus 210, power transmission unit 220, a light emitting unit 230, and a communication unit 240. For example, high-frequency power supply apparatus 210 converts the commercial AC power supplied from the system power supply into a high frequency electric power, and outputs the power to power transmission unit 220. It is to be noted that the frequency of the high-frequency electric power generated by high-frequency power supply apparatus 210 is, for example, 1 MHz to several tens of MHz.

Power transmission unit 220 is fixed onto the floor of the parking space and configured such that the high-frequency electric power supplied from high-frequency power supply apparatus 210 is transmitted to power reception unit 110 of vehicle 100 in a non-contact manner. Specifically, power transmission unit 220 includes a self-resonant coil which resonates with the self-resonant coil included in power reception unit 110 through the electromagnetic field for transmitting the electric power to power reception unit 110 in a non-contact manner. A plurality of light emitting units 230 are provided on power transmission unit 220 to show the position of power transmission unit 220. Light emitting unit 230 includes, for example, a light-emitting diode and the like. Communication unit 240 serves as a communication interface for establishing communication between power feeding apparatus 200 and vehicle 100.

In the above-described vehicle power feeding system 10, the high-frequency electric power is supplied from power transmission unit 220 of power feeding apparatus 200, and the self-resonant coil included in power reception unit 110 of vehicle 100 and the self-resonant coil included in power transmission unit 220 resonate with each other through the electromagnetic field, which causes power feeding apparatus 200 to supply the electric power to vehicle 100.

When power feeding apparatus 200 supplies the electric power to vehicle 100, it is necessary to guide vehicle 100 to power feeding apparatus 200 and adjust the positions of power reception unit 110 of vehicle 100 and power transmission unit 220 of power feeding apparatus 200.

In the position adjustment, in the first stage, the positional relationship between power reception unit 110 of vehicle 100 and power transmission unit 220 of power feeding apparatus 200 is sensed based on the image captured by camera 120. Based on the sensed result, the vehicle is controlled such that the vehicle is guided to power transmission unit 220. More specifically, camera 120 captures images of light emitting units 230 provided on power transmission unit 220, which is followed by the image recognition of the position and the direction of each of light emitting units 230. Based on the results of the image recognition, the position and the direction of each of power transmission unit 220 and the vehicle are recognized. Then, based on the recognition results, the vehicle is guided to power transmission unit 220.

Since the area of power transmission unit 220 facing power reception unit 110 is smaller than the area of the floor of the vehicle body, camera 120 cannot capture an image of power transmission unit 220 when power transmission unit 220 is moved to be located below the vehicle body. In such a case, the first stage is switched to the second stage. In the second stage, power transmission unit 220 supplies the electric power to power reception unit 110, and, based on the power feeding condition, the distance between power transmission unit 220 and power reception unit 110 is sensed. Then, based on the distance information, the vehicle is controlled such that the positions of power transmission unit 220 and power reception unit 110 are adjusted.

The electric power transmitted as a test signal from power transmission unit 220 in the above-mentioned second stage is set to be smaller in magnitude than the electric power for charging that is supplied from power transmission unit 220 to power reception unit 110 after completion of position adjustment between power transmission unit 220 and power reception unit 110. The reason why the electric power is transmitted from power transmission unit 220 in the above-mentioned second stage is to sense the distance between power transmission unit 220 and power reception unit 110, and is because a large electric power used for practical power feeding is not required.

The non-contact power feeding method used for vehicle power feeding system 10 according to the present embodiment will then be described. In vehicle power feeding system 10 according to the present embodiment, the resonance method is used to supply the electric power from power feeding apparatus 200 to vehicle 100.

Figure 2:
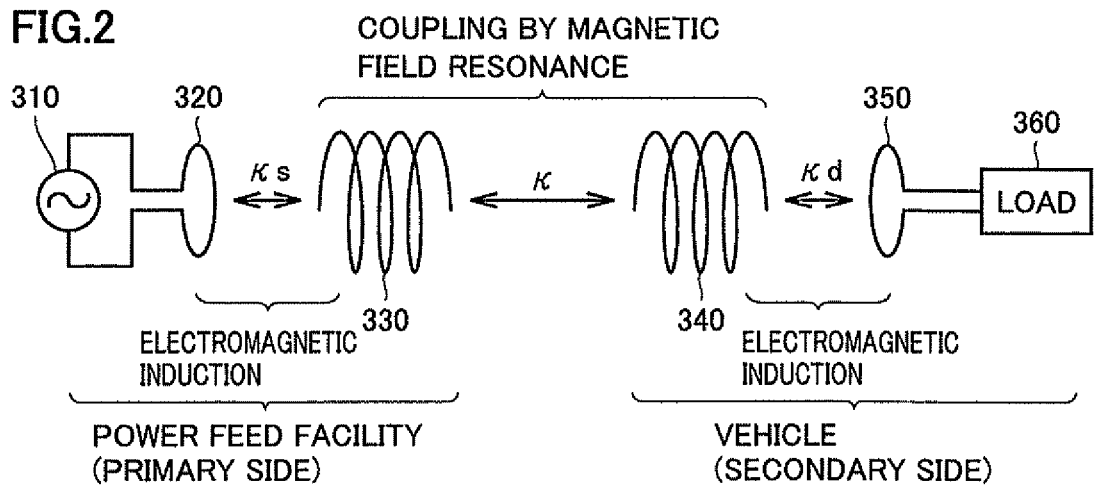
FIG. 2 is a diagram for illustrating the principle of power transmission by the resonance method.

FIG. 2 is a diagram for illustrating the principle of power transmission by the resonance method.

Referring to FIG. 2, according to this resonance method, as in the case where two tuning forks resonate with each other, two LC resonant coils having the same natural frequency resonate with each other in the electromagnetic field (near field), which causes the electric power to be transmitted from one of the coils to the other of the coils through the electromagnetic field.

Specifically, a primary coil 320 is connect to a high-frequency power supply 310 to supply the electric power having a high-frequency of 1 M to several tens of MHz to a primary self-resonant coil 330 magnetically coupled to primary coil 320 by electromagnetic induction. Primary self-resonant coil 330 is an LC resonator consisting of an inductance of the coil itself and a stray capacitance, and resonates through the electromagnetic field (near field) with a secondary self-resonant coil 340 having the same resonance frequency as that of primary self-resonant coil 330. This causes the energy (electric power) to be transferred from primary self-resonant coil 330 through the electromagnetic field to secondary self-resonant coil 340. The energy (electric power) transferred to secondary self-resonant coil 340 is extracted by a secondary coil 350 magnetically coupled to secondary self-resonant coil 340 by electromagnetic induction, and supplied to a load 360. It is to be noted that the power transmission by the resonance method is implemented when a Q value showing the intensity of the resonance between primary self-resonant coil 330 and secondary self-resonant coil 340 is greater than, for example, 100.

As compared to FIG. 1, secondary self-resonant coil 340 and secondary coil 350 correspond to power reception unit 110 in FIG. 1, and primary coil 320 and primary self-resonant coil 330 correspond to power transmission unit 220 in FIG. 1.

Figure 3:
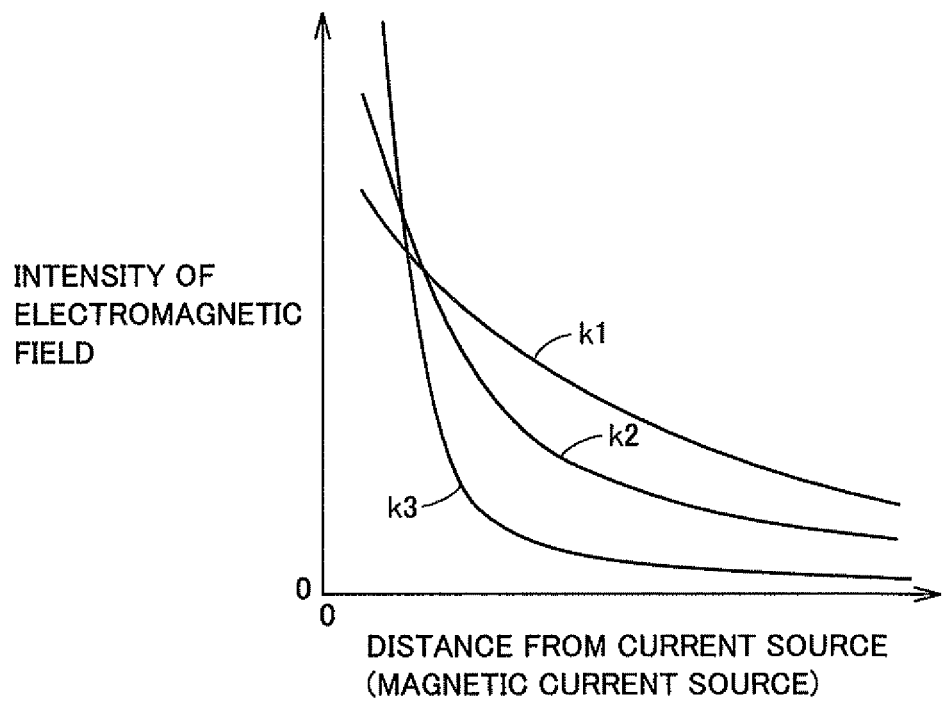
FIG. 3 is a diagram showing the relationship between the distance from a current source (a magnetic current source) and the intensity of the electromagnetic field.

FIG. 3 is a diagram showing the relationship between the distance from a current source (a magnetic current source) and the intensity of the electromagnetic field.

Referring to FIG. 3, the electromagnetic field includes three components. A curve k1 represents a component inversely proportional to the distance from the wave source and is referred to as a "radiation electromagnetic field". A curve k2 represents a component inversely proportional to the square of the distance from the wave source and is referred to as an "induction electromagnetic field". Furthermore, a curve k3 represents a component inversely proportional to the cube of the distance from the wave source and is referred to as an "electrostatic magnetic field".

Among others, there is a region where the intensity of the electromagnetic wave sharply decreases in accordance with the distance from the wave source. In the resonance method, this near field (evanescent field) is used to transmit the energy (electric power). In other words, the near field is used to cause resonance between a pair of resonators (for example, a pair of LC resonant coils) having the same natural frequency, to thereby transmit the energy (electric power) from one of the resonators (primary self-resonant coil) to the other of the resonators (secondary self-resonant coil). This near field does not allow propagation of the energy (electric power) over a long distance. Accordingly, as compared to the electromagnetic wave carrying the energy (electric power) by the "radiation electromagnetic field" allowing propagation of the energy over a long distance, the resonance method allows power transmission with reduced energy loss.

Figure 4:
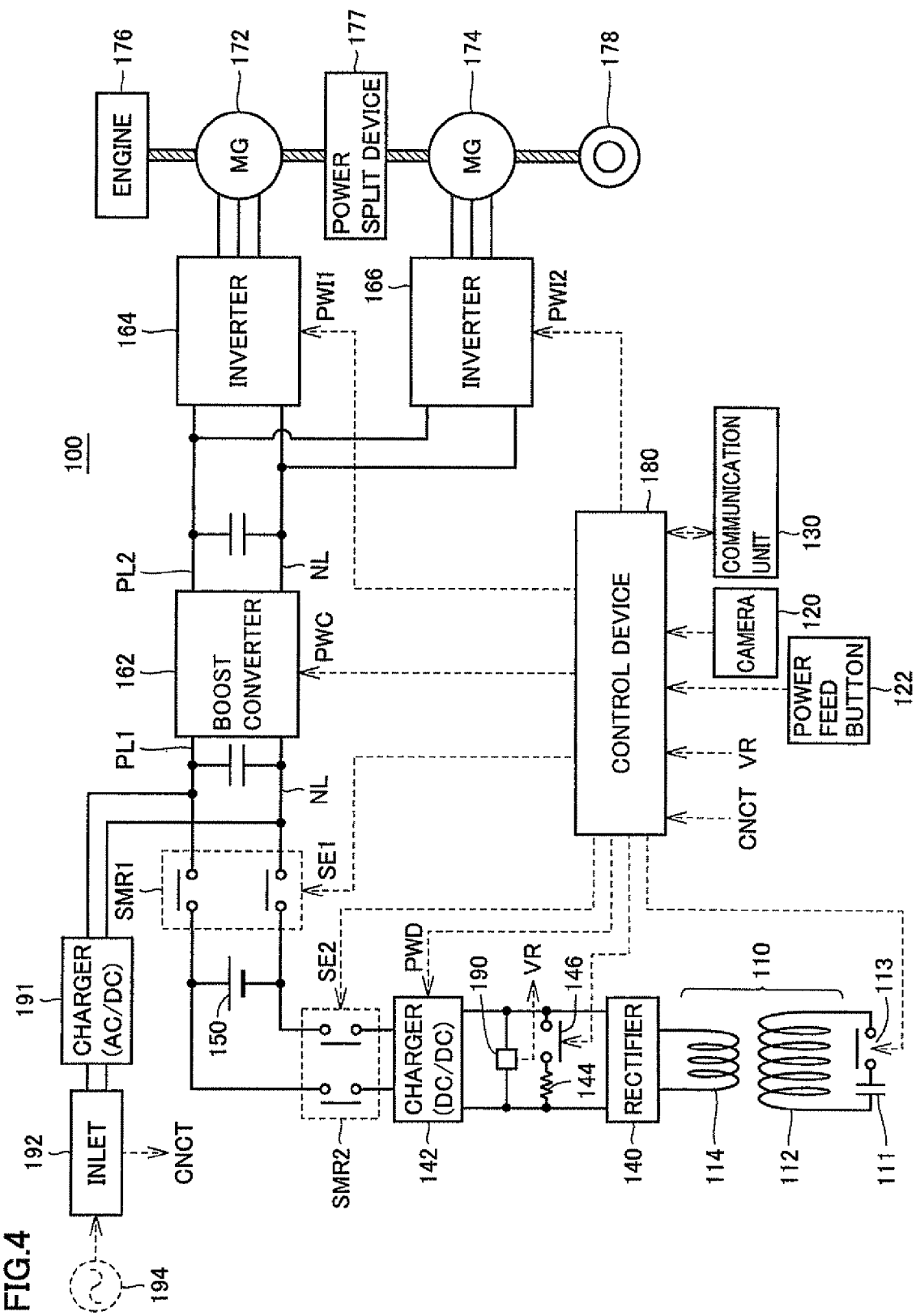
FIG. 4 is a configuration diagram showing the details of a vehicle 100 shown in FIG. 1.

FIG. 4 is a configuration diagram showing the details of vehicle 100 shown in FIG. 1.

Referring to FIG. 4, vehicle 100 includes a power storage device 150, a system main relay SMR1, a boost converter 162, inverters 164, 166, motor generators 172, 174, an engine 176, a power split device 177, and a driving wheel 178.

Vehicle 100 further includes a secondary self-resonant coil 112, a secondary coil 114, a rectifier 140, a DC/DC converter 142, a system main relay SMR2, and a voltage sensor 190.

Vehicle 100 further includes a charger 191 and an inlet 192 for plug-in charging for receiving the electric power from a power supply 194 external to the vehicle. Vehicle 100 further includes a control device 180, a camera 120, a communication unit 130, and a power feed button 122.

Vehicle 100 is equipped with engine 176 and motor generator 174 as a power source. Engine 176 and motor generators 172 and 174 are coupled to power split device 177. Vehicle 100 runs with the driving power generated by at least one of engine 176 and motor generator 174. The power generated by engine 176 is split by power split device 177 into two paths including a path through which the power is transmitted to driving wheel 178 and a path through which the power is transmitted to motor generator 172.

Motor generator 172 is an AC rotating electric machine including, for example, a three-phase AC synchronous electric motor provided with a rotor into which a permanent magnet is incorporated. Motor generator 172 generates electric power using the kinetic energy of engine 176 split by power split device 177. For example, when the state of charge (also referred to as an "SOC") of power storage device 150 is reduced below a predetermined value, engine 176 is started and motor generator 172 generates electric power, to charge power storage device 150.

Motor generator 174 is also an AC rotating electric machine including, for example, a three-phase AC synchronous electric motor provided with a rotor into which a permanent magnet is incorporated, as with motor generator 172. Motor generator 174 generates driving force using at least one of the electric power stored in power storage device 150 and the electric power generated by motor generator 172. The driving force of motor generator 174 is then transmitted to driving wheel 178.

Furthermore, during braking of the vehicle and during reduction in acceleration on the downwardly sloping surface, the dynamic energy stored in the vehicle as kinetic energy and potential energy is used for rotary drive of motor generator 174 through driving wheel 178, to cause motor generator 174 to operate as a power generator. Consequently, motor generator 174 operates as a regenerative brake for converting the driving energy into electric power to generate braking force. The electric power generated by motor generator 174 is then stored in power storage device 150.

Power split device 177 can use a planetary gear having a sun gear, a pinion gear, a carrier, and a ring gear. The pinion gear engages with the sun gear and the ring gear. The carrier is coupled to the crankshaft of engine 176 while rotatably supporting the pinion gear. The sun gear is coupled to the rotation shaft of motor generator 172. The ring gear is coupled to the rotation shaft of motor generator 174 and driving wheel 178.

Power storage device 150 serves as a rechargeable direct-current (DC) power supply including, for example, a secondary battery such as lithium-ion or nickel-metal hydride secondary battery. Power storage device 150 stores the electric power supplied from DC/DC converter 142, and also stores the regenerative electric power generated by motor generators 172 and 174. Power storage device 150 then supplies the stored electric power to boost converter 162. It is to be noted that a large-capacity capacitor may also be employed as power storage device 150 and any power buffer may be used that can temporarily store the electric power supplied from power feeding apparatus 200 (FIG. 1) and the regenerative electric power from motor generators 172 and 174, to supply the stored electric power to boost converter 162.

System main relay SMR1 is disposed between power storage device 150 and boost converter 162. System main relay SMR1 electrically connects power storage device 150 to boost converter 162 when a signal SE1 from control device 180 is activated, and interrupts the electric path between power storage device 150 and boost converter 162 when signal SE1 is deactivated. Based on a signal PWC from control device 180, boost converter 162 boosts the voltage on a positive electrode line PL2 to a voltage greater than or equal to the voltage output from power storage device 150. It is to be noted that boost converter 162 includes, for example, a DC chopper circuit.

Inverters 164 and 166 are provided corresponding to motor generators 172 and 174, respectively. Inverter 164 drives motor generator 172 based on a signal PWI1 from control device 180, and inverter 166 drives motor generator 174 based on a signal PWI2 from control device 180. It is to be noted that inverters 164 and 166 include, for example, a three-phase bridge circuit.

Secondary self-resonant coil 112 has both ends connected to capacitor 111 through a switch (a relay 113), and resonates with the primary resonant coil of power feeding apparatus 200 through the electromagnetic field when the switch (relay 113) is rendered conductive. This resonance causes power feeding apparatus 200 to supply the electric power. While FIG. 4 shows an example in which capacitor 111 is provided, adjustment with respect to the primary self-resonant coil may be carried out so as to achieve resonance by stray capacitance of the coil, in place of the capacitor.

With regard to secondary self-resonant coil 112, the number of its turns is appropriately set so as to increase the distance to the primary self-resonant coil of power feeding apparatus 200, a Q value (for example, Q>100) showing the intensity of the resonance between the primary self-resonant coil and secondary self-resonant coil 112, and is showing the degree of coupling therebetween.

Secondary coil 114 is coaxially disposed on secondary self-resonant coil 112 and can be magnetically coupled to secondary self-resonant coil 112 by electromagnetic induction. This secondary coil 114 extracts, by electromagnetic induction, the electric power supplied from secondary self-resonant coil 112 and outputs the electric power to rectifier 140. It is to be noted that secondary self-resonant coil 112 and secondary coil 114 form a power reception unit 110 shown in FIG. 1.

Rectifier 140 rectifies the AC power extracted by secondary coil 114. Based on a signal PWD from control device 180, DC/DC converter 142 converts the electric power rectified by rectifier 140 into the voltage level of power storage device 150, and outputs the resultant to power storage device 150.

System main relay SMR2 is disposed between DC/DC converter 142 and power storage device 150. When a signal SE2 from control device 180 is activated, system main relay SMR2 electrically connects power storage device 150 to DC/DC converter 142. When signal SE2 is deactivated, system main relay SMR2 interrupts the electric path between power storage device 150 and DC/DC converter 142. Voltage sensor 190 detects a voltage VR between rectifier 140 and DC/DC converter 142, and outputs the detected value to control device 180.

A resistance 144 and a relay 146 which are connected in series are provided between rectifier 140 and DC/DC converter 142. Relay 146 is controlled by control device 180 such that it is rendered conductive when the position of vehicle 100 is adjusted during the non-contact power feeding, as described below.

Based on the accelerator pedal position, the vehicle speed and the signals from various sensors, control device 180 generates signals PWC, PWI1 and PWI2 for driving boost converter 162, motor generators 172 and 174, respectively. Control device 180 outputs generated signals PWC, PWI1 and PWI2 to boost converter 162, inverters 164 and 166, respectively. During the vehicle running, control device 180 activates signal SE1 to cause system main relay SMR1 to be turned on, and deactivates signal SE2 to cause system main relay SMR2 to be turned off.

Furthermore, when power feeding apparatus 200 (FIG. 1) feeds the electric power to vehicle 100, control device 180 receives the image captured by and sent from camera 120. Furthermore, control device 180 receives, from power feeding apparatus 200 through communication unit 130, the information on the electric power (voltage and current) which is transmitted from power feeding apparatus 200, and also receives, from voltage sensor 190, the detected value of voltage VR which is detected by voltage sensor 190. Based on the data, control device 180 controls the vehicle parking by the method described below such that the vehicle is guided to power transmission unit 220 of power feeding apparatus 200 (FIG. 1).

When the parking control to power transmission unit 220 is completed, control device 180 transmits a power feeding command to power feeding apparatus 200 through communication unit 130, and also activates signal SE2 to cause system main relay SMR2 to be turned on. Control device 180 then generates signal PWD for driving DC/DC converter 142 and outputs the generated signal PWD to DC/DC converter 142.

Figure 5:
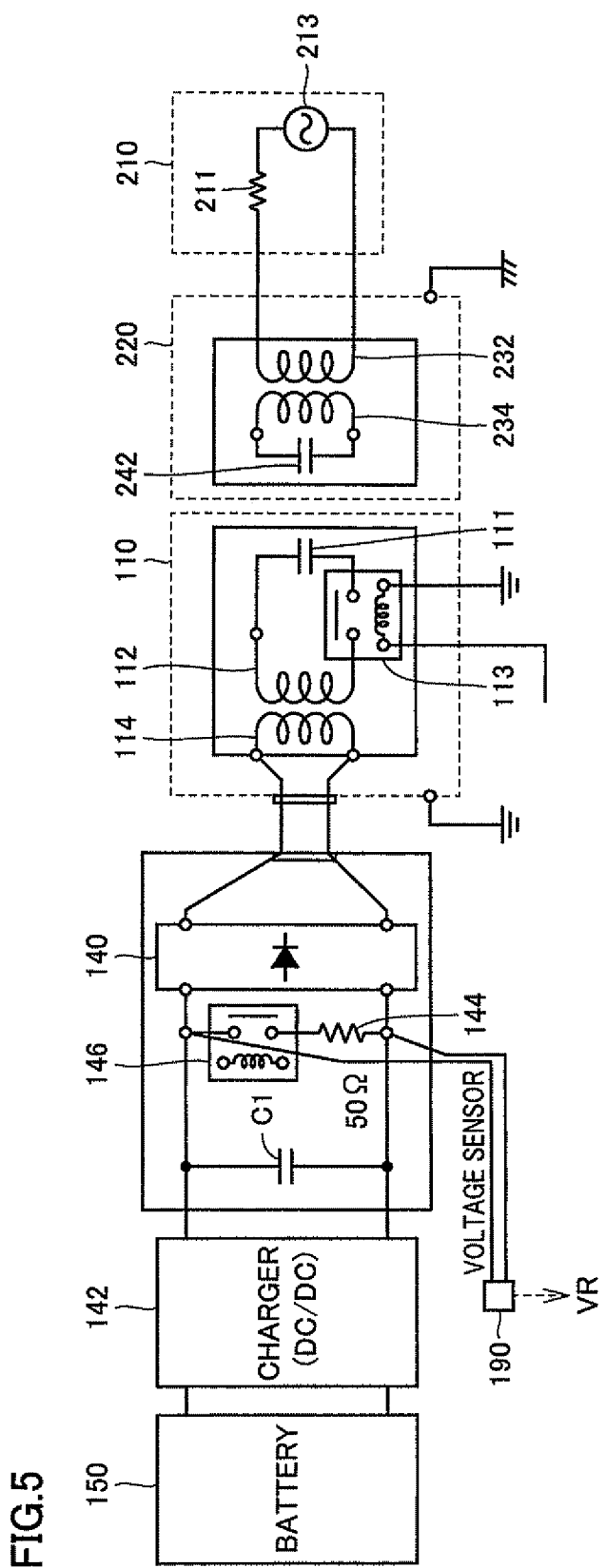
FIG. 5 is a circuit diagram for illustrating a power reception unit 110 on the vehicle side and a power transmission unit 220 on the power feeding apparatus side in greater detail.

FIG. 5 is a circuit diagram for illustrating power reception unit 110 on the vehicle side and power transmission unit 220 on the power feeding apparatus side in greater detail.

Referring to FIG. 5, high-frequency power supply apparatus 210 is represented by a high-frequency AC power supply 213 and a resistance 211 which shows an impedance of the power supply.

Power transmission unit 220 includes a primary coil 232 connected to high-frequency power supply apparatus 210, a primary self-resonant coil 234 magnetically coupled to primary coil 232 by electromagnetic induction, and a capacitor 242 connected to both ends of primary self-resonant coil 234.

Power reception unit 110 includes secondary self-resonant coil 112 resonating with primary self-resonant coil 234 through the electromagnetic field, and capacitor 111 and relay 113 connected in series to both ends of secondary self-resonant coil 112. When receiving the electric power, relay 113 is controlled such that it is rendered conductive.

Power reception unit 110 further includes secondary coil 114 magnetically couple to secondary self-resonant coil 112. Rectifier 140 rectifies the AC power received by secondary coil 114. A capacitor C1 is connected to the output of rectifier 140. Relay 146 and resistance 144 used for the position adjustment between the vehicle and the power feed facility are connected between the electrodes of capacitor C1 A charger 142 (DC/DC converter) is further connected to the output of rectifier 140 for converting the voltage into a suitable charging voltage. The converted charging voltage is supplied to the battery (power storage device 150).

Resistance 144 is set to an impedance of, for example, 50Ω. This value is adjusted so as to be matched to the impedance represented by resistance 211 of high-frequency power supply apparatus 210.

When the parking position of the vehicle is adjusted during the non-contact power feeding to the vehicle, voltage sensor 190 detects the voltage across resistance 144 and outputs the detected value VR to control device 180.

When adjustment of the vehicle position is completed and the vehicle is charged by the external power supply through the non-contact power feeding, voltage sensor 190 detects the voltage input to charger 142 as detected value VR.

Figure 6:
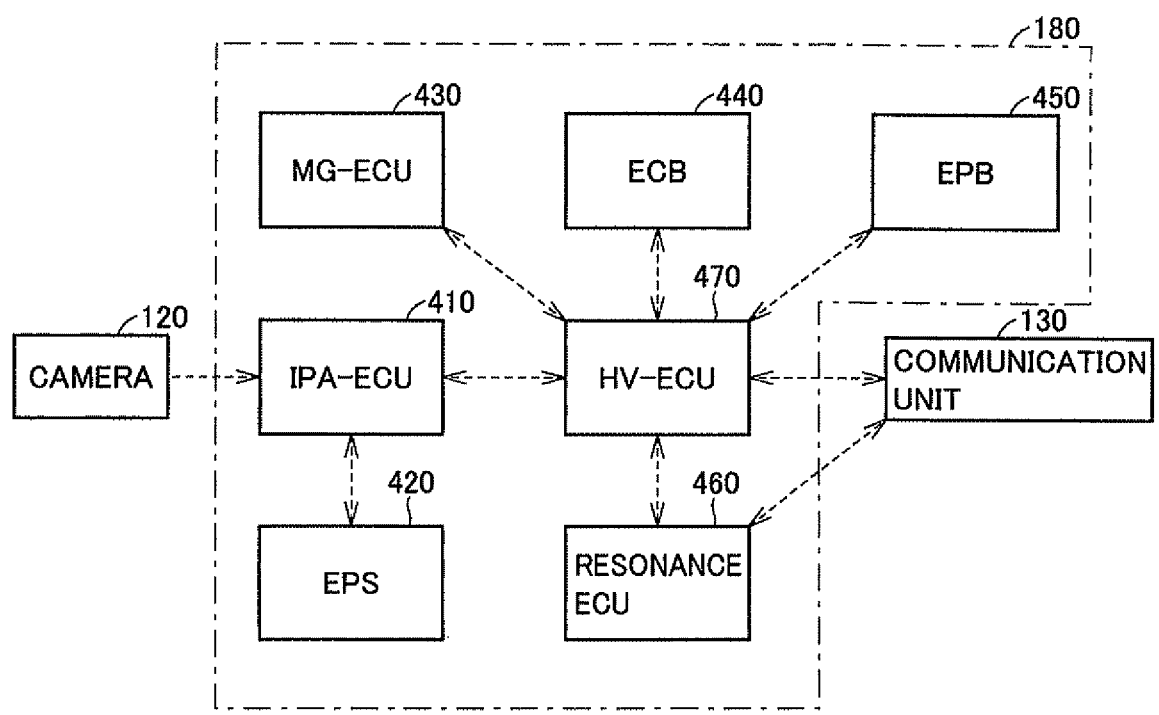
FIG. 6 is a functional block diagram of a control device 180 shown in FIG. 4.

FIG. 6 is a functional block diagram of control device 180 shown in FIG. 4.

Referring to FIG. 6, control device 180 includes an IPA (Intelligent Parking Assist)-ECU (Electronic Control Unit) 410, an EPS (Electric Power Steering) 420, an MG (Motor-Generator)-ECU 430, an ECB (Electronically Controlled Brake) 440, an EPB (Electric Parking Brake) 450, a resonance ECU 460, and an HV (Hybrid Vehicle)-ECU 470.

When the vehicle is operated in the charging mode, IPA-ECU 410 performs the guidance control for guiding the vehicle to power transmission unit 220 of power feeding apparatus 200 (FIG. 1) based on the image information received from camera 120 (the first guidance control).

Specifically, IPA-ECU 410 recognizes power transmission unit 220 based on the image information received from camera 120. In this case, light emitting units 230 for showing the position and the direction of power transmission unit 220 are provided in power transmission unit 220. Based on the images of light emitting units 230 captured by camera 120, IPA-ECU 410 recognizes the positional relationship (approximate distance and direction) with power transmission unit 220. Based on the recognition result, IPA-ECU 410 outputs a command to EPS 420 to guide the vehicle to power transmission unit 220 in the appropriate direction.

Furthermore, the vehicle approaches power transmission unit 220 to cause power transmission unit 220 to be located below the vehicle body, which prevents camera 120 from capturing an image of power transmission unit 220. Then, IPA-ECU 410 notifies HV-ECU 470 of termination of the guidance control (the first guidance control) based on the image information from camera 120. During the first guidance control, EPS 420 automatically controls the steering based on the command from IPA-ECU 410.

Based on the command from HV-ECU 470, MG-ECU 430 controls motor generators 172, 174 and boost converter 162. Specifically, MG-ECU 430 generates signals for driving motor generators 172, 174 and boost converter 162, respectively, and outputs the signals to inverters 164, 166 and boost converter 162, respectively.

ECB 440 controls braking of the vehicle based on the command from HV-ECU 470. Specifically, based on the command from HV-ECU 470, ECB 440 controls the hydraulic brake, and also controls the hydraulic brake and the regenerative brake by motor generator 174 to operate cooperatively with each other. EPB 450 controls a motor-driven parking brake based on the command from HV-ECU 470.

Resonance ECU 460 receives, from power feeding apparatus 200 through communication unit 130, the information on the electric power transmitted from power feeding apparatus 200 (FIG. 1). Furthermore, resonance ECU 460 receives, from voltage sensor 190 (FIG. 4), the detected value of voltage VR showing the power reception voltage in the vehicle. Resonance ECU 460 then senses the distance between power transmission unit 220 of power feeding apparatus 200 and power reception unit 110 of the vehicle, for example, by comparing voltage VR with the power transmission voltage from power feeding apparatus 200.

Figure 7:
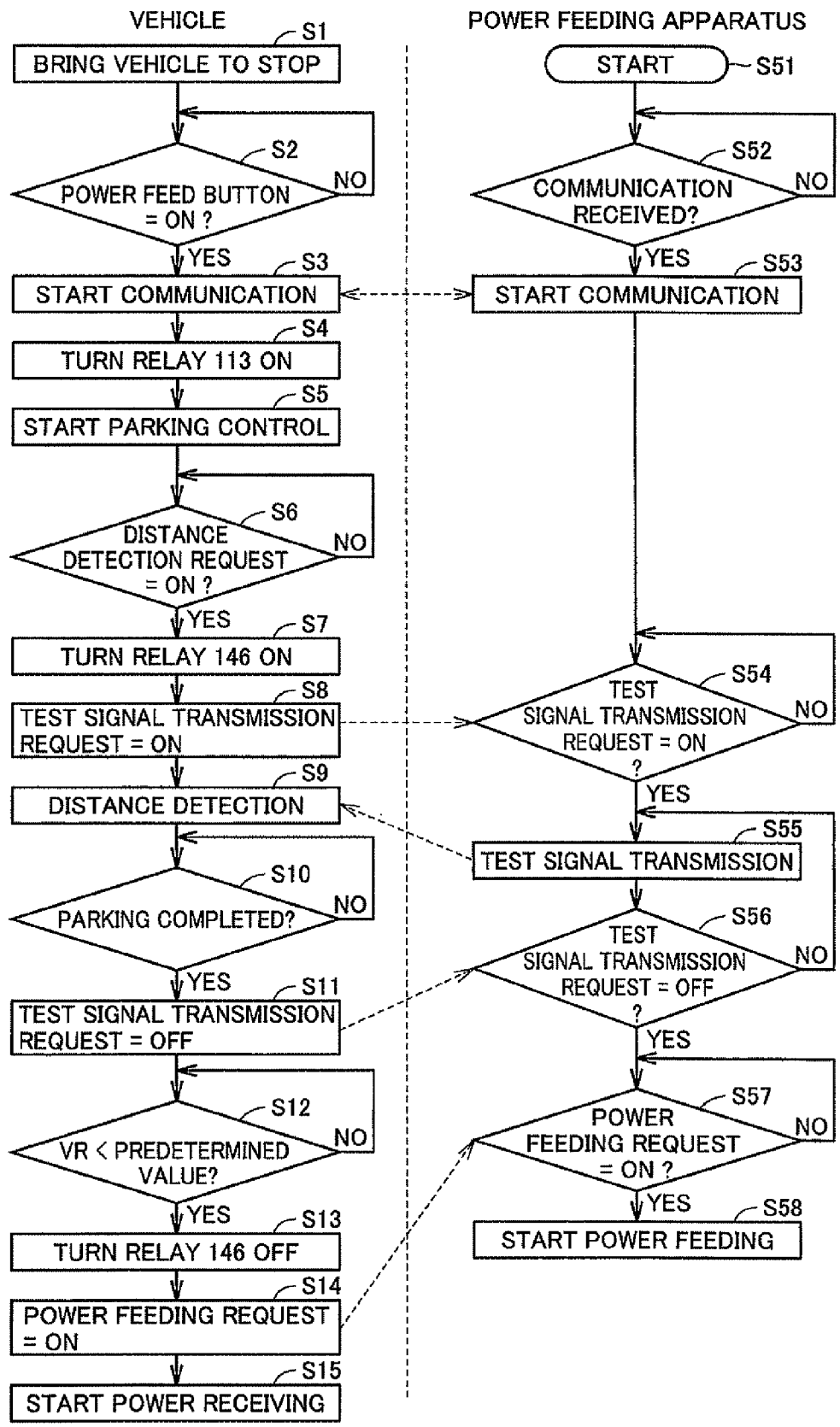
FIG. 7 is a flowchart for illustrating the control performed in the stage where the vehicle position is adjusted during the non-contact power feeding.

FIG. 7 is a flowchart for illustrating the control performed in the stage where the vehicle position is adjusted during the non-contact power feeding. The left half of FIG. 7 shows the control procedure carried out on the vehicle side, and the right half thereof shows the control procedure carried out on the power feeding apparatus side.

Referring to FIGS. 1 and 7, first on the vehicle side, the process of bringing the vehicle to a stop is carried out in step S1. Then, in step S2, it is detected whether power feed button 122 is set to the ON state. In the case where the power feed button is not set to the ON state, control device 180 waits until the power feed button is set to the ON state. In the case where it is detected in step S2 that power feed button 122 is set to the ON state, the process proceeds to step S3. In step S3, control device 180 uses communication unit 130 to start communication with power feeding apparatus 200.

On the power feeding apparatus side, when the process is started in step S51, the power feeding apparatus waits in step S52 until it receives communication from the vehicle side. In the case where a request to start the communication is issued, the communication is started in step S53. Then in step S54, the power feeding apparatus waits that a test signal transmission request is brought into the ON state.

On the vehicle side, the process of starting the communication in step S3 is followed by the control process for setting relay 113 to the ON state in step S4. In step S5, the parking control is started. The parking control is carried out using the IPA (intelligent parking assist) system employing the camera in the first stage.

When the vehicle approaches the power feeding position to some extent, a distance detection request is set to the ON state within control device 180. Then, the process proceeds from step S6 to step S7, and control device 180 sets relay 146 to the ON state. In step S8, control device 180 notifies the power feeding apparatus side that the test signal transmission request is set to the ON state. Then, in step S54, the power feeding apparatus detects that the test signal transmission request is set to the ON state, and proceeds to step S55 to transmit the test signal to the vehicle. As to this test signal, although the electric power similar to that transmitted after start of charging may be transmitted, it is preferable to set the test signal to be weaker than that transmitted during the practical power transmission.

This test signal is used to detect that the vehicle reaches the distance where the electric power can be supplied, based on the fact that the voltage arising across resistance 144 reaches a certain voltage.

Figure 8:
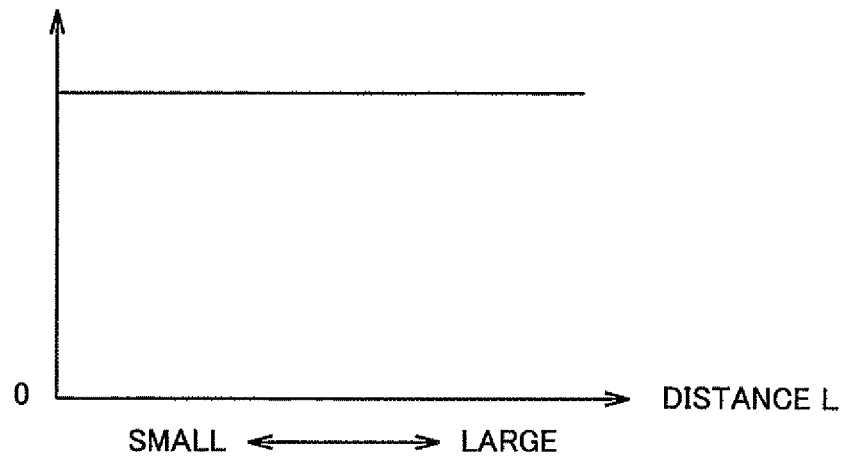
FIG. 8 is a diagram showing the relationship between the primary side voltage and a distance L.

FIG. 8 is a diagram showing the relationship between the primary side voltage and a distance L.

Figure 9:
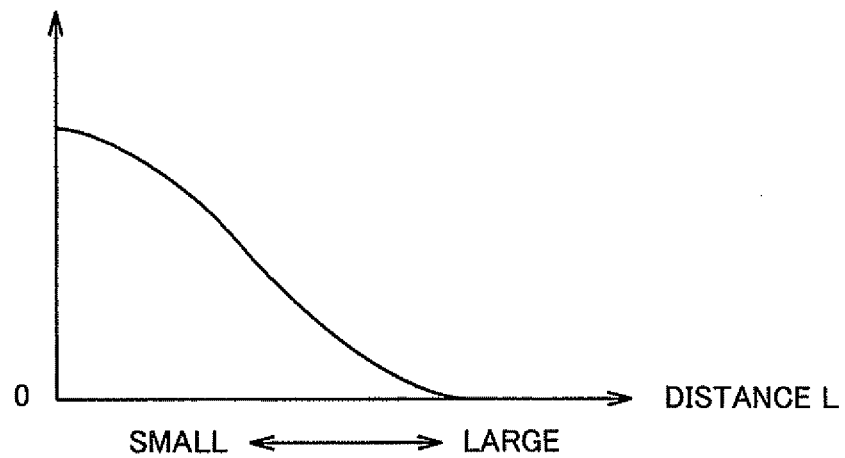
FIG. 9 is a diagram showing the relationship between the secondary side voltage and distance L.

FIG. 9 is a diagram showing the relationship between the secondary side voltage and distance L.

Specifically, as compared to the fixed primary side voltage (the voltage output from power feeding apparatus 200) as shown in FIG. 8, the secondary side voltage (the power reception voltage of vehicle 100) varies, as shown in FIG. 9, in accordance with a distance L between power transmission unit 220 of power feeding apparatus 200 and power reception unit 110 of vehicle 100. Thus, the relationship between the primary side voltage and the secondary side voltage shown in FIGS. 8 and 9, respectively, is measured in advance to create a map and the like, to thereby allow detection of the distance between power transmission unit 220 and power reception unit 110 based on the detected value of voltage VR which shows the secondary side voltage.

It is to be noted that the distance can also be detected based on the primary side current.

Figure 10:
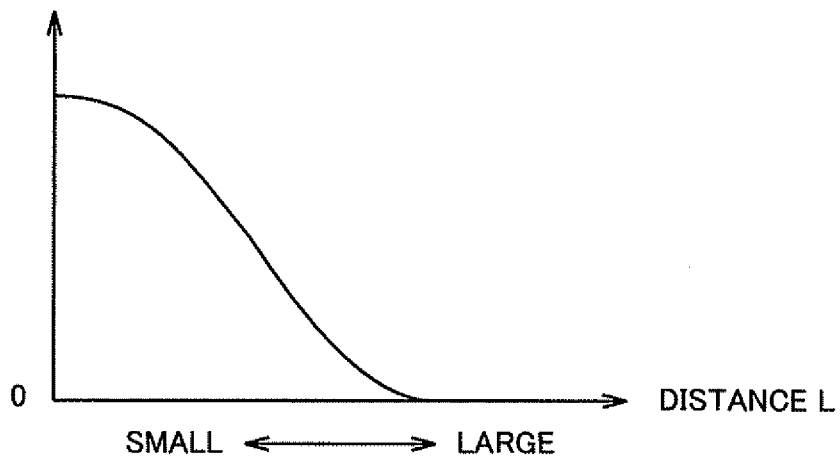
FIG. 10 is a diagram showing the relationship between the primary side current and distance L.

FIG. 10 is a diagram showing the relationship between the primary side current and distance L.

As shown in FIG. 10, the primary side current (the current output from power feeding apparatus 200) also varies in accordance with distance L between power transmission unit 220 and power reception unit 110. By using this relationship, the distance between power transmission unit 220 and power reception unit 110 may be sensed based on the detected value of the current output from power feeding apparatus 200.

Referring back to FIG. 6, when resonance ECU 460 senses the distance between power transmission unit 220 and power reception unit 110, it outputs the distance information to HV-ECU 470. Furthermore, when resonance ECU 460 receives a charging start command from HV-ECU 470, it activates signal SE2 output to system main relay SMR2 to cause system main relay SMR2 to be turned on. Resonance ECU 460 then generates a signal for driving DC/DC converter 142, and outputs the signal to DC/DC converter 142.

When the vehicle is operated in the running mode, HV-ECU 470 outputs a control command to MG-ECU 430 and ECB 440 in accordance with the manipulation condition of an accelerator pedal/a brake pedal, the running condition of the vehicle, and the like. Furthermore, when the operator operates the parking brake switch and the like to provide an instruction to actuate the parking brake, HV-ECU 470 outputs an operation command to EPB 450.

On the other hand, when the vehicle is operated in the charging mode, HV-ECU 470 establishes communication with power feeding apparatus 200 (FIG. 1) through communication unit 130, and outputs an activation command to power feeding apparatus 200 through communication unit 130 to activate power feeding apparatus 200. When power feeding apparatus 200 is activated, HV-ECU 470 outputs a command to power feeding apparatus 200 through communication unit 130 to turn on light emitting units 230 to light up which are provided on power transmission unit 220 of power feeding apparatus 200. When light emitting units 230 are turned on, HV-ECU 470 outputs, through communication unit 130 to power feeding apparatus 200, a guidance-under-control signal showing that the guidance control for guiding vehicle 100 to power transmission unit 220 is being carried out, and also outputs a command to IPA-ECU 410 to instruct to carry out the guidance control (the first guidance control) based on the image information from camera 120.

Furthermore, when HV-ECU 470 receives a notification from IPA-ECU 410 that the first guidance control is ended, it carries out the guidance control based on the information on the distance between power transmission unit 220 and power reception unit 110 (the second guidance control). Specifically, HV-ECU 470 receives the information on the distance between power transmission unit 220 of power feeding apparatus 200 and power reception unit 110 of the vehicle from resonance ECU 460. Based on the distance information, HV-ECU 470 outputs a command to MG-ECU 430 and ECB 440 controlling driving and braking, respectively, of the vehicle so as to minimize the distance between power transmission unit 220 and power reception unit 110.

It is determined whether the distance between power transmission unit 220 and power reception unit 110 is minimized, for example, based on the time when the differential value of distance L between power transmission unit 220 and power reception unit 110 received from resonance ECU 460 reaches zero.

Figure 11:
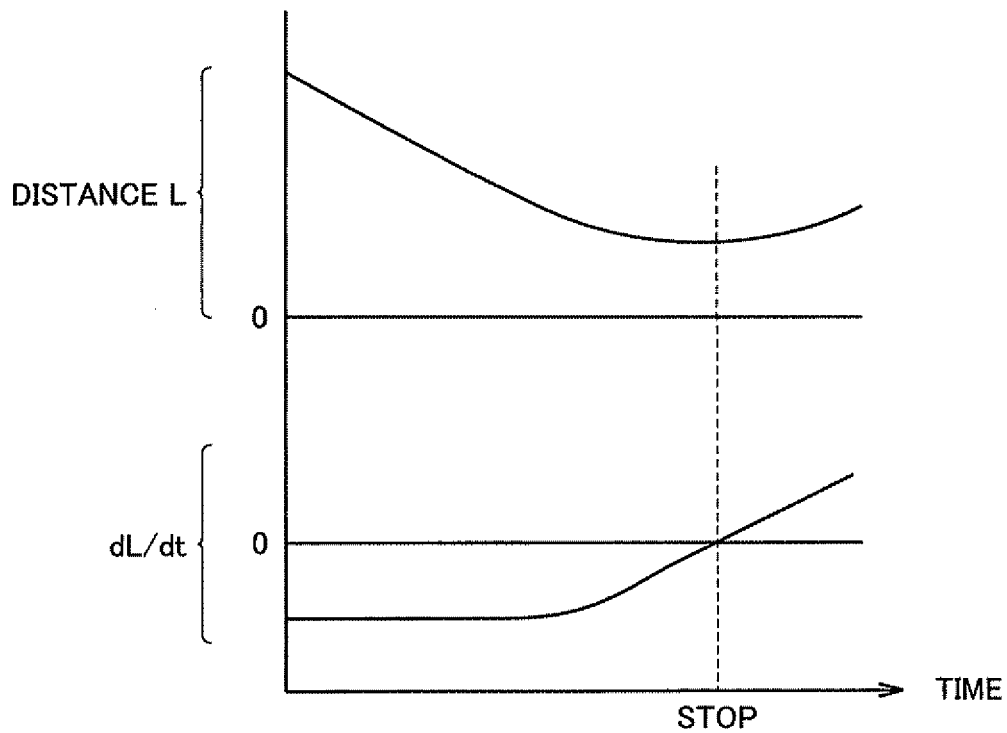
FIG. 11 is a diagram showing the state where the differential value of distance L reaches zero.

FIG. 11 is a diagram showing the state where the differential value of distance L reaches zero. The vehicle needs to be stopped only when dL/Dt=0 as shown in FIG. 11. When position adjustment between power transmission unit 220 and power reception unit 110 is completed, HV-ECU 470 outputs an operation command to EPB 450.

Referring back to FIG. 7, in step S10, while repeatedly determining whether the power reception coil (secondary self-resonant coil 112) is positioned with respect to the power transmission coil (primary self-resonant coil 234) such that the power reception coil can receive the electric power, control device 180 determines the direction of the vehicle to be moved so as to position the power reception coil with respect to the power transmission coil such that the power reception coil can receive the electric power.

When it is determined in step S10 that the parking position is settled and the parking is completed, the process proceeds from step S10 to step S11. Control device 180 in the vehicle then sets the test signal transmission request to the OFF state. When the power feeding apparatus is notified of this setting through communication, it is detected in step S56 that the test signal transmission request is switched to the OFF state, and then, the transmission of the test signal is stopped.

On the power feeding apparatus side, it is then detected in step S57 whether a power feeding request is switched to the ON state.

On the vehicle side, the test signal transmission request is set to the OFF state in step S11. It is then determined in step S12 whether voltage VR is reduced below a predetermined value. In step S12, it is waited until voltage VR is reduced below the predetermined value. Then, the process proceeds from step S12 to step S13.

In step S13, relay 146 is controlled such that it is brought from the ON state into the OFF state. HV-ECU 470 then outputs a power feeding command through communication unit 130 to power feeding apparatus 200 to cause power feeding apparatus 200 to feed the electric power, and also outputs a charging start command to resonance ECU 460. Then, in step S14, HV-ECU 470 communicates with the power feeding apparatus to notify that the power feeding request is set to the ON state.

On the power feeding apparatus side, in step S57, it is detected that the power feeding request is brought into the ON state. In step S58, power feeding is started. Accordingly, on the vehicle side, the power reception is started in step S15.

Figure 12:
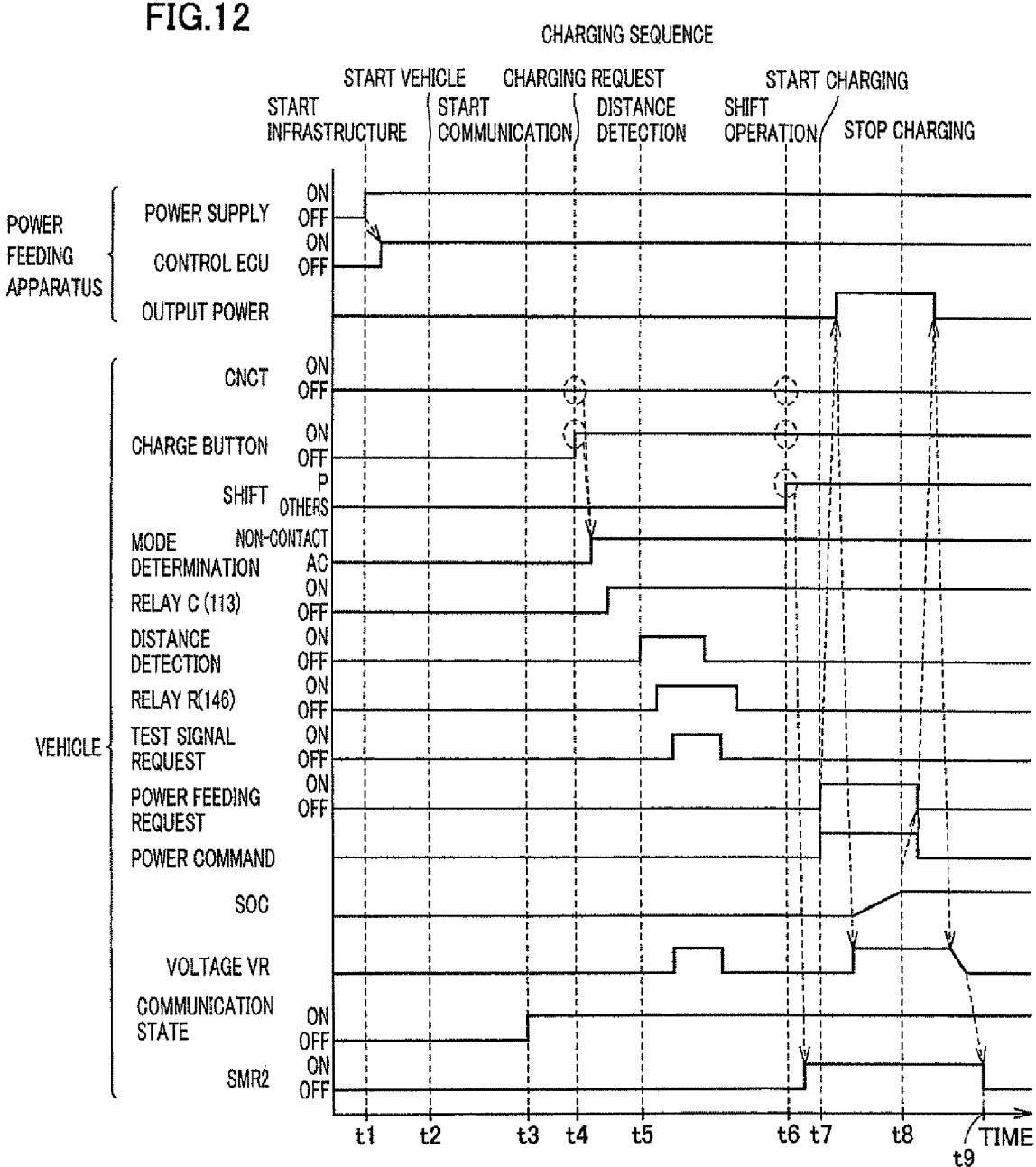
FIG. 12 is an operation waveform diagram for illustrating the charging operation in accordance with the embodiment of the present invention.

FIG. 12 is an operation waveform diagram for illustrating the charging operation in accordance with the embodiment of the present invention.

Referring to FIG. 12, the power supply of the power feeding apparatus is activated from the OFF state to the ON state at a time t1, which causes the control ECU of the power feeding apparatus to be also activated from the OFF state to the ON state.

The activation switch of the vehicle is manipulated at a time t2. Then, at a time t3, the communication unit starts the communication which is then switched from the OFF state to the ON state.

Then, at a time t4, when the charge button (power feed button 122 in FIG. 4) is set from the OFF state to the ON state, it is determined whether or not there is an input of a signal CNCT showing whether the plug-in charging is carried out by inlet 192. If signal CNCT is in the ON state, plug-in charging from an external power supply 194 is carried out. If signal CNCT is in the OFF state, non-contact charging is carried out without employing the plug-in charging. This determination is made at the timing at which the charge button is set from the OFF state to the ON state. Then, in the case shown in FIG. 12, since signal CNCT is in the OFF state at time t4, the mode is determined as a non-contact charging mode. Relay 113 is switched from the OFF state to the ON state in order to allow non-contact charging. This causes the impedance of secondary self-resonant coil 112 to be matched to the impedance of primary self-resonant coil 234, which allows power transmission by the resonance method.

Then, at times t5 to t6, the parking position is adjusted while carrying out distance detection. First, the distance detection request is switched from the OFF state to the ON state, relay 146 is subsequently switched from the OFF state to the ON state, and then, the test signal request is switched from the OFF state to the ON state. Accordingly, the power feeding apparatus starts test transmission of the electric power for distance detection. Voltage VR varies accordingly. On the vehicle side, control device 180 detects the distance between the power reception unit and the power reception unit by referring to the relationship shown in FIG. 9. When it is detected that the units are positioned at an appropriate distance from each other (distance detection is switched from ON to OFF), the test signal request is also switched from the ON state to the OFF state, and relay 146 is also switched from the ON state to the OFF state, with the result that charger 142 can receive the electric power.

When the shift operation, that is, the shift changed to the parking position, is detected at time t6, system main relay SMR2 in FIG. 4 is controlled such that it is rendered conductive. Then, the vehicle issues a charging request to the power feeding apparatus and also sends a power command as a value through communication. Consequently, voltage VR is applied to charger 142 to start charging, which causes a gradual increase in state of charge SOC of the battery.

At a time t8, when state of charge SOC reaches a threshold value at which charging is to be stopped, the power feeding request from the vehicle to the power feeding apparatus is switched to the OFF state while the power command is also changed to 0 (zero). In response to this, the power feeding apparatus sets the output power back to 0 to stop power transmission. Then, after it is waited until the electric charges charged in capacitor C1 in FIG. 5 are discharged, system main relay SMR2 in FIG. 4 is controlled to be set from the ON state to the OFF state, to complete the charging process.

As described above, in the first embodiment, resistance 144 matched to the impedance of the power supply of the power feeding apparatus is connected to rectifier 140 and charger 142, to detect the distance by using the results of the test transmission of the electric power. This allows distance detection to be made with accuracy and with low electric power by a simple method.

Second Embodiment

In the first embodiment, resistance 144 for detecting a test transmission signal is disposed between rectifier 140 and charger 142, as shown in FIG. 5. Resistance 144 may be disposed in a different position.

Figure 13:
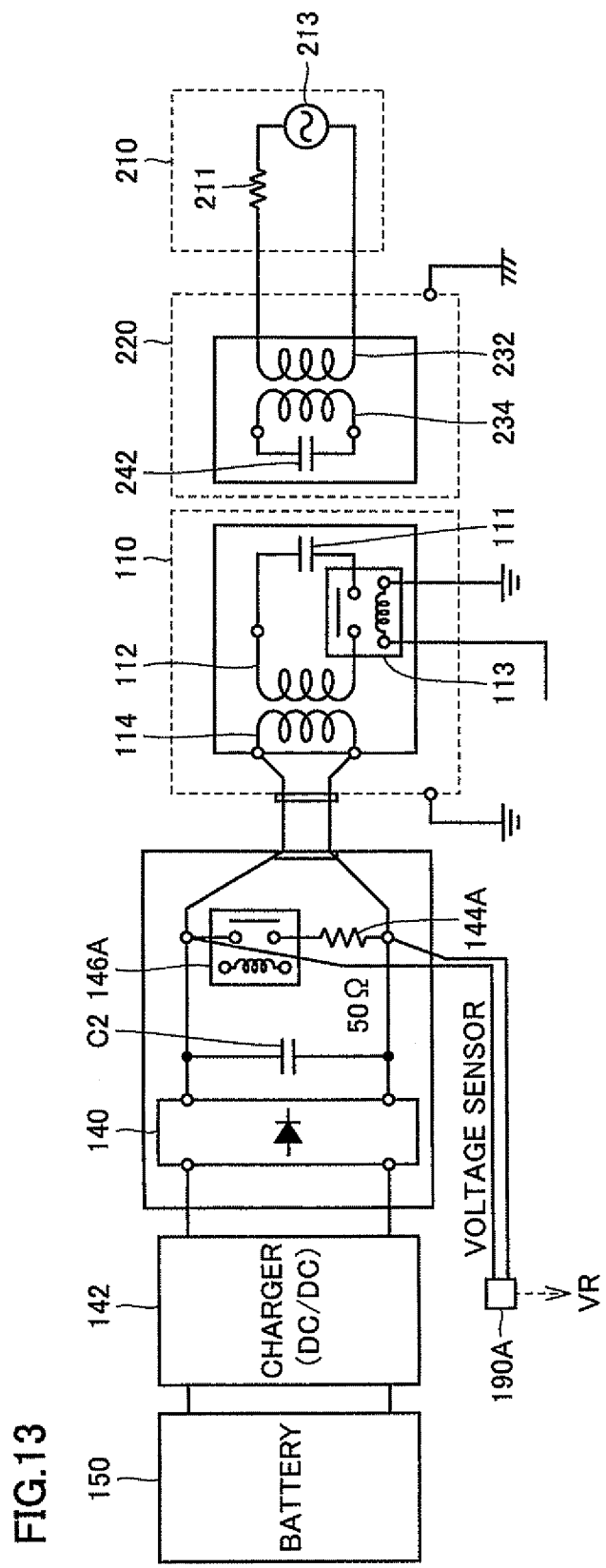
FIG. 13 is a diagram showing the position of a resistance for detecting a test signal in the second embodiment.

FIG. 13 is a diagram showing the position of the resistance for detecting a test signal in the second embodiment.

In FIG. 13, a resistance 144A and a relay 146A are connected in series between the terminals of secondary coil 114. A capacitor C2 is similarly connected between the terminals of secondary coil 114.

Relay 146A is controlled to be rendered conductive when the parking position is determined while detecting the distance, and controlled to be in the OFF state when the battery (power storage device 150) is charged through charger 142. Secondary coil 114 outputs an AC signal. Accordingly, a voltage sensor 190A detecting this signal is required to use the voltage sensor for detecting the AC peak. Since this alternating current has a frequency of a megahertz band, such a voltage sensor as that incorporating an AD converter having a sampling frequency set to a higher value is used.

Figure 14:
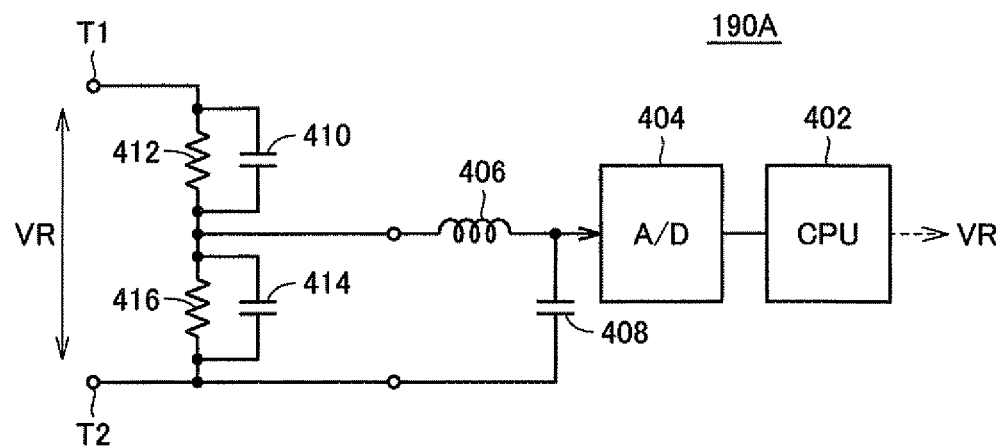
FIG. 14 is a diagram showing an example of the configuration of a voltage sensor 190A.

FIG. 14 is a diagram showing an example of the configuration of voltage sensor 190A.

Referring to FIG. 14, voltage sensor 190A includes terminals T1, T2 connected to both ends, respectively, of secondary coil 114, resistances 512, 516 connected in series for dividing voltage VR applied across terminals T1 and T2, a capacitor 510 connected in parallel to resistance 512, and a capacitor 514 connected in parallel to resistance 516.

The divided voltage is extracted from the connection node of resistances 512 and 516. The resistance values of resistances 512 and 516 for determining a divided voltage ratio is set in accordance with the relationship between an input voltage VR and the input range of the AD converter.

Voltage sensor 190A includes a coil 506 and a capacitor 508 forming a filter for removing the noise of the divided voltage, an AD converter 504 receiving an output from the filter formed of coil 506 and capacitor 508, and a CPU 502 acquiring the measured value which is converted into a digital value by the AD converter. CPU 502 outputs voltage value VR to control device 180 in FIG. 4.

Even in the case where the resistance for distance detection is connected at the position shown in the second embodiment during the distance detection, the distance detection can be made with accuracy and with low electric power by a simple method as in the first embodiment.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

DESCRIPTION OF THE REFERENCE SIGNS 10 vehicle power feeding system, 100 vehicle, 110 power reception unit, 111, 113, 242, C1, C2 capacitor, 112, 340 secondary self-resonant coil, 114, 350 secondary coil, 120 camera, 122 power feed button, 130 communication unit, 140 rectifier, 142, 191 charger, 144, 144A, 211, 512, 516 resistance, 146, 146A relay, 150 power storage device, 162 boost converter, 164, 166 inverter, 172, 174 motor generator, 176 engine, 177 power split device, 178 driving wheel, 180 control device, 190, 190A voltage sensor, 192 inlet, 194 external power supply, 200 power feeding apparatus, 210 high-frequency power supply apparatus, 213 high-frequency AC power supply, 220 power transmission unit, 230 light emitting unit, 232, 320 primary coil, 234, 330 primary self-resonant coil, 240 communication unit, 310 high-frequency power supply, 360 load, 410 IPA-ECU, 420 EPS, 430 MG-ECU, 440 ECB, 450 EPB, 460 resonance ECU, 470 HV-ECU, 502 CPU, 504 AD converter, 506 coil, 508, 510, 514 capacitor, PL2 positive electrode line, SMR1, SMR2 system main relay, T1 terminal.

The invention claimed is:

1. A non-contact power receiving apparatus receiving electric power from a power transmission coil for transmitting the electric power received from a power supply, said non-contact power receiving apparatus comprising:
   a power reception coil configured to receive, by non-contact power feeding, the electric power transmitted from said power transmission coil;
   a rectifier configured to rectify the electric power received by said power reception coil;
   a load disposed to receive the electric power rectified by said rectifier;
   a resistance and a connection switch provided in a pair of power lines comprising a first power line and a second power line for transmitting the electric power from said power reception coil to said load, wherein the first power line comprises a first node, wherein the second power line comprises a second node, and wherein said resistance and said connection switch is connected in series between said pair of power lines such that the resistance and a connection switch form a circuit formed in series in between the first and second nodes; and
   a control device for controlling said connection switch.

2. The non-contact power receiving apparatus according to claim 1, further comprising:
   a motor for driving a vehicle; and
   a power storage device for storing the electric power supplied to said motor, wherein
   said load includes a charger for charging said power storage device, and
   said resistance and said connection switch are disposed in a portion of said pair of power lines where said rectifier and said power storage device are connected to each other.

3. The non-contact power receiving apparatus according to claim 1, further comprising:
   a motor for driving a vehicle;
   a power storage device for storing the electric power supplied to said motor; and
   a secondary coil capable of receiving the electric power from said power reception coil, wherein
   said load includes a charger for charging said power storage device, and
   said resistance and said connection switch are disposed in a portion of said pair of power lines where said rectifier and said secondary coil are connected to each other.

4. The non-contact power receiving apparatus according to claim 3, further comprising a voltage sensor for alternating-current peak detection for detecting a voltage arising across said resistance, wherein said control device determines where said power reception coil is positioned based on a detection result of said voltage sensor.

5. The non-contact power receiving apparatus according to claim 1, wherein
   said power supply and said power transmission coil are provided in a power feeding apparatus external to a vehicle, and
   when receiving an instruction from a driver of said vehicle to supply the electric power, said control device renders said connection switch conductive to start test transmission of the electric power to said power feeding apparatus, and, based on a magnitude of a voltage arising across said resistance, determines whether said power reception coil is positioned with respect to said power transmission coil such that said power reception coil can receive the electric power.

6. The non-contact power receiving apparatus according to claim 5, wherein said control device determines a direction of the vehicle to be moved so as to position said power reception coil with respect to said power transmission coil such that said power reception coil can receive the electric power, while repeatedly determining whether said power reception coil is positioned with respect to said power transmission coil such that said power reception coil can receive the electric power.

7. The non-contact power receiving apparatus according to claim 1, wherein an impedance of said resistance is matched to the impedance of said power supply.

8. A vehicle equipped with the non-contact power receiving apparatus according to claim 1.

9. A vehicle equipped with the non-contact power receiving apparatus according to claim 2.

10. A vehicle equipped with the non-contact power receiving apparatus according to claim 3.

11. A vehicle equipped with the non-contact power receiving apparatus according to claim 4.

12. A vehicle equipped with the non-contact power receiving apparatus according to claim 5.

13. A vehicle equipped with the non-contact power receiving apparatus according to claim 6.

14. A vehicle equipped with the non-contact power receiving apparatus according to claim 7.

15. The non-contact power receiving apparatus according to claim 1, wherein
   said control device renders said connection switch conductive in determining where said power reception coil is positioned, and renders said connection switch nonconductive when the electric power is transmitted to said load from said power reception coil through said rectifier.

16. A non-contact power receiving apparatus receiving electric power from a power transmission coil for transmitting the electric power received from a power supply, said non-contact power receiving apparatus comprising:
   a power reception coil configured to receive, by non-contact power feeding, the electric power transmitted from said power transmission coil;
   a rectifier configured to rectify the electric power received by said power reception coil;
   a load disposed to receive the electric power rectified by said rectifier;
   a resistance and a connection switch provided in a pair of power lines for transmitting the electric power from said power reception coil to said load, said resistance and said connection switch being connected in series between said pair of power lines;

a voltage sensor for alternating-current peak detection for detecting a voltage arising across said resistance; and a control device for controlling said connection switch, wherein said control device determines where said power reception coil is positioned based on a detection result of said voltage sensor.

17. A non-contact power receiving apparatus receiving electric power from a power transmission coil for transmitting the electric power received from a power supply, said non-contact power receiving apparatus comprising:

a power reception coil configured to receive, by non-contact power feeding, the electric power transmitted from said power transmission coil;

a rectifier configured to rectify the electric power received by said power reception coil;

a load disposed to receive the electric power rectified by said rectifier;

a resistance and a connection switch provided in a pair of power lines comprising a first power line and a second power line for transmitting the electric power from said power reception coil to said load, wherein the first power line comprises a first node, wherein the second power line comprises a second node, and wherein said resistance and said connection switch is connected in series between said pair of power lines such that the resistance and a connection switch form a circuit formed in series in between the first and second nodes;

a voltage sensor for alternating-current peak detection for detecting a voltage arising across said resistance; and a control device for controlling said connection switch to determine whether said power reception coil is positioned with respect to said power transmission coil such that said power reception coil can receive the electric power.

18. The non-contact power receiving apparatus according to claim 17, wherein:

said control device rendering said connection switch conductive when determining where said power reception coil is positioned, and rendering said connection switch nonconductive when the electric power is transmitted to said load from said power reception coil through said rectifier.

* * * * *